(12) United States Patent
Caldeira et al.

(10) Patent No.: US 12,338,071 B2
(45) Date of Patent: Jun. 24, 2025

(54) VERTICAL TRAY STORAGE SYSTEM WITH ACTIVE ELEVATOR POSITION-SENSING

(71) Applicant: VIDIR SOLUTIONS INC., Arborg (CA)

(72) Inventors: Dimitri Warlet Caldeira, Arborg (CA); Dean Michael Stoyanowski, Arborg (CA); Patrick James Oliver, Arborg (CA); Chad McCue, Arborg (CA)

(73) Assignee: Vidir Solutions Inc., Winnipeg (CA)

(*) Notice: Subject to any disclaimer, the term of this patent is extended or adjusted under 35 U.S.C. 154(b) by 454 days.

(21) Appl. No.: 17/837,587

(22) Filed: Jun. 10, 2022

(65) Prior Publication Data
US 2023/0202757 A1   Jun. 29, 2023

Related U.S. Application Data

(60) Provisional application No. 63/293,186, filed on Dec. 23, 2021.

(51) Int. Cl.
*B65G 1/137* (2006.01)
*B65G 1/127* (2006.01)

(52) U.S. Cl.
CPC ............ *B65G 1/127* (2013.01); *B65G 1/137* (2013.01); *B65G 2203/0283* (2013.01); *B65G 2203/044* (2013.01)

(58) Field of Classification Search
CPC ................................. B65G 1/137; B65G 1/127
See application file for complete search history.

(56) References Cited

U.S. PATENT DOCUMENTS

| | | | | |
|---|---|---|---|---|
| 3,881,424 A | * | 5/1975 | Thompson | B66F 9/072 414/277 |
| 4,286,911 A | * | 9/1981 | Benjamin | B65G 1/0414 191/1 R |
| 4,459,078 A | * | 7/1984 | Chiantella | B65G 1/0414 414/284 |
| 5,203,661 A | * | 4/1993 | Tanita | H05K 13/021 414/280 |

(Continued)

*Primary Examiner* — Jonathan Snelting
(74) *Attorney, Agent, or Firm* — Adrian D. Battison; Ade & Company Inc.; Kyle R. Satterthwaite (57) ABSTRACT

A storage system comprises a rack defining a plurality of storage locations arranged one above the other, trays removably stored at the storage locations, and an elevator configured for moving a selected tray between its assigned storage location and a retrieval space below the storage locations. The storage locations are formed by pairs of horizontally opposite spaced apart rails with inwardly projecting sidewalls on which a tray can be rested. The elevator comprises a platform configured to carry and transfer the trays to and from the rack, and a drive system configured to move the platform that includes a servomotor. The platform carries optical sensors used cooperatively with the servomotor to detect a selected storage location of a tray to be stored or retrieved. Upon input of a selected storage location, the platform is displaced initially at a high speed until reaching a vertically offset position relative to the selected storage position detected using the servomotor, and therefrom at a low speed until sidewalls of the rails of the selected storage location are detected using the optical sensors.

10 Claims, 3 Drawing Sheets

(56) References Cited

U.S. PATENT DOCUMENTS

| | | | | |
|---|---|---|---|---|
| 5,524,776 | A * | 6/1996 | Hall | B65G 1/026 |
| | | | | 211/151 |
| 6,325,586 | B1 * | 12/2001 | Loy | B65G 1/02 |
| | | | | 414/281 |
| 9,725,240 | B2 * | 8/2017 | Salichs | B65G 1/065 |
| 10,993,552 | B2 * | 5/2021 | Keller | B65G 1/026 |
| 11,084,622 | B2 * | 8/2021 | Brumm | B65D 19/0004 |

* cited by examiner

FIG. 3

VERTICAL TRAY STORAGE SYSTEM WITH ACTIVE ELEVATOR POSITION-SENSING

This application claims the benefit under 35 U.S.C. 119(e) of U.S. Provisional Application Ser. No. 63/293,186 filed Dec. 23, 2021.

FIELD OF THE INVENTION

The present invention relates generally to a storage system comprising a storage rack defining a plurality of storage locations arranged one above the other, a plurality of trays removably stored at the storage locations of the rack, and an elevator configured for moving a selected one of the trays between an assigned one of the storage locations and a retrieval space below the storage locations, and more particularly to such a storage system with a servomotor operative to raise and lower an elevator platform and sensors distinct from the servomotor providing position information of the platform.

BACKGROUND

The Applicant commercially offers a vertical storage system, referred to in industry as a vertical lift module, which has a storage rack with a plurality of vertical storage locations defined by pairs of horizontally opposite rails; removable trays removably supported on the pairs of rails; and an elevator in communication with the storage rack and having a platform for retrieving trays and presenting them to a retrieval space below the storage locations. Typically, the elevator has at least one tensioned endless member such as a belt or chain along which the platform moves vertically.

A control system of the vertical lift module, which controls the elevator for moving a selected one of the trays from its storage location to the retrieval space, should account for factors that affect positioning of the elevator platform relative to the tray storage locations, for example sagging of the tensioned member or deformation of rails.

SUMMARY OF THE INVENTION

According to an aspect of the invention there is provided a system for storing items comprising:
a storage rack having:
  a plurality of upstanding posts arranged in longitudinally and laterally spaced relation to each other and for resting on a support surface, wherein the posts delimit an upwardly-extending storage space for containing the items during storage and a retrieval space below the storage space with an access opening at a longitudinal front of the rack for user-retrieval of one or more selected ones of the items; and
  a plurality of pairs of horizontally-opposite laterally spaced-apart rails supported on the posts at vertically spaced positions thereon and forming a plurality of respective storage locations arranged one above another in the storage space, wherein each one of each pair of the rails has a pair of inwardly-projecting vertically spaced-apart parallel sidewalls;
a plurality of trays respectively removably received at the respective storage locations of the storage rack, wherein each tray comprises:
  a base having a generally-horizontal upwardly-facing support surface for receiving items to be stored, wherein the base has a front and a longitudinally opposite rear and laterally opposite sides;
  a pair of upstanding sidewalls connected at the sides of the base; and
  at least one outwardly-projecting flange on each of the sidewalls extending longitudinally of the tray and defining an underside arranged for resting on one of the sidewalls of the rails of the storage rack; and
an elevator configured for moving the trays between the storage locations and the retrieval space, wherein the elevator comprises:
  an elevator shaft adjacent the retrieval space and in opposite relation to the access opening and arranged for resting on the support surface, wherein the elevator shaft defines a generally vertically extending passageway in communication with the storage space and spanning from a bottom of the elevator shaft located at or adjacent the access opening of the storage rack and to a top of the elevator shaft located at or adjacent an uppermost one of the storage locations of the storage rack;
  a platform supported in the elevator shaft for movement within the passageway and configured to carry the trays and transfer the trays between the elevator shaft and the rack;
  a drive system configured to move the platform vertically relative to the elevator shaft, wherein the drive system includes a motor, a tensioned member defining a generally vertical path of movement of the platform and supported by the elevator shaft to span from the bottom to the top thereof, and a rotational transmission assembly operatively interconnecting the motor and the tensioned member;
  a plurality of optical sensors arranged on the platform to detect the sidewalls of the rails of the storage rack;
  wherein the motor is a servomotor operable at a plurality of travel speeds and configured to sense position of the platform relative to the elevator shaft; and
  an elevator controller operatively communicated with the motor and the optical sensors, wherein the elevator controller is configured to receive, as input, a selected one of the storage locations for retrieving a corresponding one of the trays stored thereat and to control the motor to:
    move the platform, at a first travel speed, from an initial position towards a vertically offset position from the rails corresponding to the selected one of the storage locations based on the position sensed by the servomotor; and
    move the platform, at a second travel speed lower than the first travel speed, from the vertically offset position and towards said rails until the sidewalls thereof are detected by the optical sensors.

This arrangement provides precise retrieval and storage of trays by accounting for factors that affect positioning of the elevator platform relative to the tray storage locations, for example sagging of the tensioned member or deformation of rails.

In one arrangement, the optical sensors comprise laser sensors configured to emit laser beams.

In one arrangement, the vertically offset position is identified by user-input of a prescribed offset from a recorded height of the rails corresponding to the selected storage location that is stored on a non-transitory memory of the elevator controller.

In one arrangement, the system further includes one or more inclinometers configured to measure an angle of inclination of the platform relative to the horizontal for detecting a tension of the tensioned member.

According to another aspect of the invention there is provided a method for retrieving items stored on removable trays in a vertical storage rack comprising:

based on user-input of a selected one of the trays for retrieval, moving an elevator platform configured to retrieve the trays at an initial travel speed from an initial position to a vertically offset position from rails of the rack associated with the selected tray; and upon detecting the vertically offset position, moving the elevator platform at a lower travel speed from the vertically offset position and towards the rails until inwardly-projecting sidewalls thereof, on which the trays are configured to rest, are detected.

In one arrangement, the vertically offset position is determined based on position information from a servomotor operable to raise and lower the elevator platform.

In one arrangement, the rails are detected by optical sensing.

BRIEF DESCRIPTION OF THE DRAWINGS

The invention will now be described in conjunction with the accompanying drawings in which.

In the drawings like characters of reference indicate corresponding parts in the different figures.

DETAILED DESCRIPTION

Figure 1:
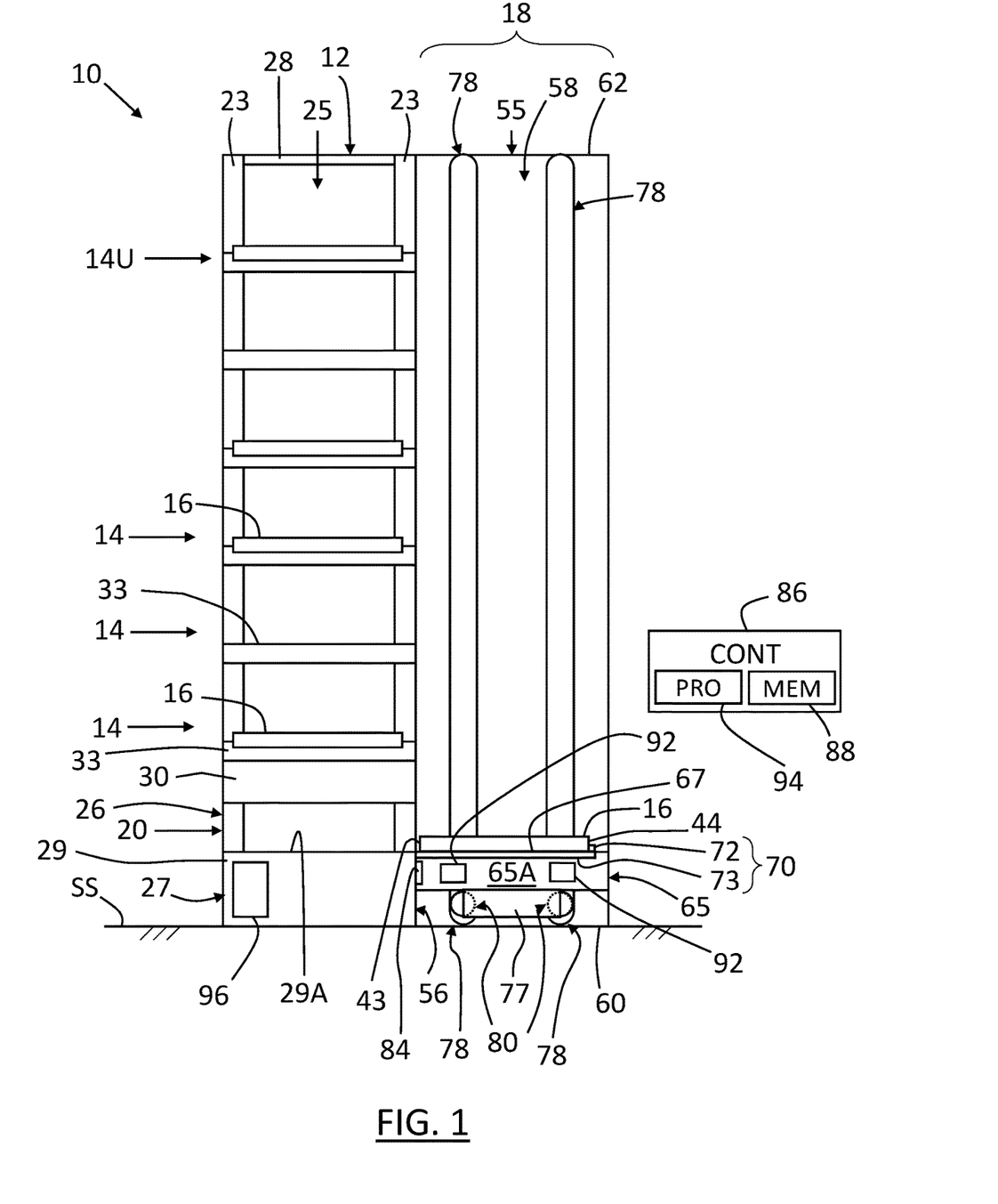
FIG. 1 schematically shows an interior side view of an arrangement of system for storing items according to the present invention.
Figure 2:
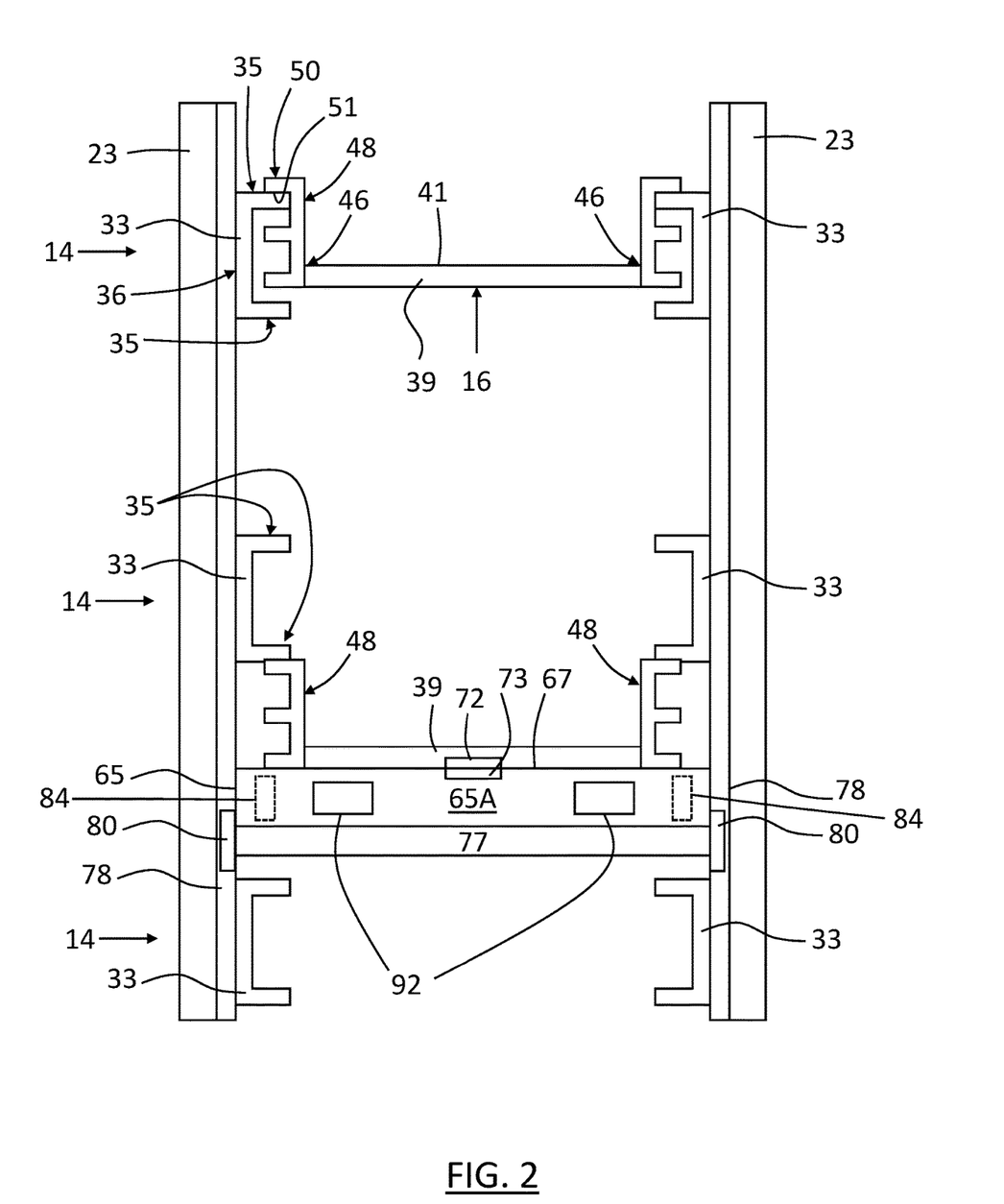
FIG. 2 schematically shows a partial interior end view of the arrangement of FIG. 1, in which an elevator platform is shown at a raised position relative to that a position thereof in FIG. 1.
Figure 3:
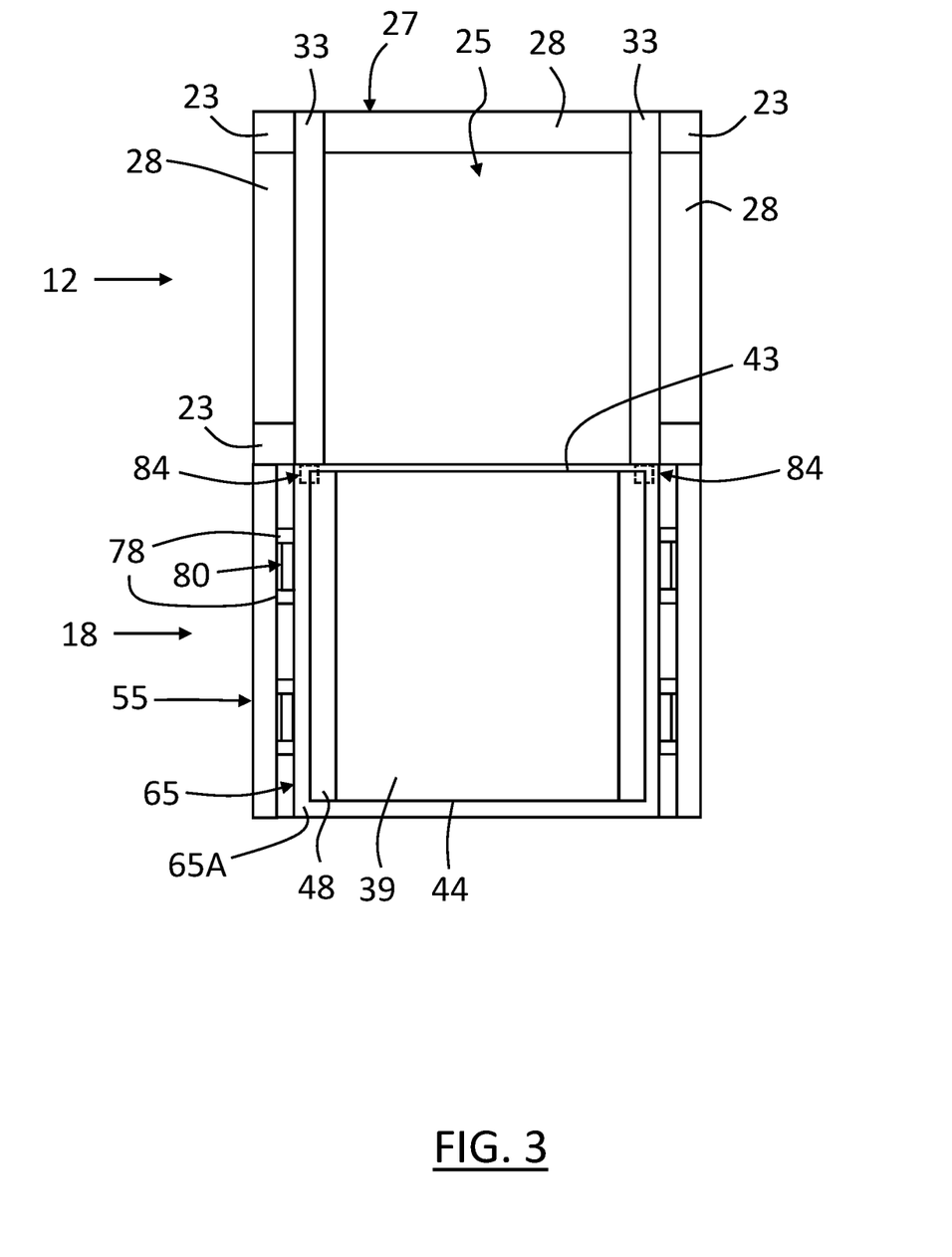
FIG. 3 schematically shows a partial interior top plan view of the arrangement of FIG. 1.

The accompanying figures show a system 10 for storing items, that is a storage system, generally comprising a storage rack 12 defining a plurality of storage locations 14 arranged one above the other; a plurality of trays 16 removably stored at the storage locations 14 of the rack 12; and an elevator 18 configured for moving a selected one of the trays between an assigned one of the storage locations 16 and a retrieval space 20 below the storage locations 16, which is at or in proximity to a support surface SS to be accessible by a user.

More specifically, the storage rack 12 comprises a plurality of upstanding posts 23 arranged in longitudinally and laterally spaced relation to each other and for resting on the support surface SS. The posts 23 delimit an upwardly-extending storage space 25 for containing the items during storage and the retrieval space 20 therebelow with an access opening 26 at a longitudinal front 27 of the rack for user-retrieval of one or more selected ones of the items. Basically, the posts 23 define a frame of the storage rack. As more clearly shown in FIG. 3, the frame may include horizontal cross-members 28 extending longitudinally or laterally between respective ones of adjacent pairs of the posts 23 to brace the frame. The access opening 26 communicates the retrieval space indicated at 20 with an exterior of the rack.

Referring back to FIG. 1, in the illustrated arrangement, the retrieval space 20 is defined by vertically spaced-apart longitudinally extending members, a lower one 29 of which defines a tray support surface 29A of the retrieval space 20 for supporting the selected tray upon presentation to the user for retrieval or pick-up and an upper one 30 of the members which partitions the storage space 25 from the retrieval space 20 therebelow. Also, it will be appreciated that in the illustrated arrangement, the storage space 25 is located vertically above the retrieval space 20 to be vertically inline therewith; however, in alternative arrangements, the storage space may be disposed in whole or in part at a horizontally spaced location from the retrieval space.

As more clearly shown in FIG. 2 which shows an intermediate portion of the storage space 25, the rack 12 includes a plurality of pairs of horizontally-opposite laterally spaced-apart rails 33 supported on the posts 23 at vertically spaced positions thereon and forming a plurality of respective storage locations 14 arranged one above another in the storage space 25. Each one of each pair of the rails, that is each individual rail, has a pair of inwardly-projecting vertically spaced-apart parallel sidewalls 35. The sidewalls 35 are supported on a base wall 36 which is mounted to a longitudinally spaced-apart pair of the posts 23 on a common lateral side of the rack 12. The base wall 36 extends longitudinally of the rack 12 and is generally vertically-oriented to have an upper side and a lower side. The sidewalls 35 of the pair of rails 33 are arranged in pairs lying in distinct vertically spaced-apart substantially horizontal planes, any one of which is suited for supporting a respective one of the trays in substantially horizontal orientation, in which orientation items stored thereon are maintained in generally fixed location on the tray by gravity, that is the items do not tend to roll off the tray.

In the illustrated arrangement, the rail sidewalls 35 are respectively located at the upper and lower sides of the base wall 36 such that the respective rail 33 is generally C-shaped in cross-section and is in the form of a channel.

With reference to FIGS. 1 and 2, turning now to the trays 16 which are respectively removably received at the respective storage locations 14 of the storage rack 12, each tray 16 comprises a base 39 having a generally-horizontal upwardly-facing support surface 41 for receiving items to be stored, a front 43 and a longitudinally opposite rear 44, and laterally opposite sides 46. Furthermore, each tray 16 includes a pair of upstanding sidewalls 48 connected at the sides 46 of the base 39, and at least one outwardly-projecting flange 50 on each of the sidewalls 48 extending longitudinally of the tray and defining an underside 51 arranged for resting on one of the sidewalls 35 of the rails 33 of the storage rack 12. The flanges 50 of the tray sidewalls 48 are arranged in respective coplanar pairs lying in vertically spaced-apart substantially horizontal distinct planes. The undersides 51 of the flanges rest on upwardly facing surfaces of the rail sidewalls 35. The base of the tray acts as a floor thereof.

In the illustrated arrangement, the tray base 39 is planar and the sidewalls 48 stand upwardly therefrom substantially at right angles to the plane defined by the base 39. Preferably, the tray includes longitudinally opposite peripheral walls (not shown) at the front 43 and rear 44 of the tray to define a container over the upper surface 41 of the base 39.

Furthermore, in the illustrated arrangement, the tray sidewalls 48 have a plurality of the flanges 50 so as to form an outwardly-opening C-channel. Adjacent flanges on a common sidewall 48 are spaced apart by a distance greater than a thickness of the rail sidewall 35 so as to be configured to receive the rail sidewall 35 therebetween. As such, the tray 16 is configured to resist vertical movement relative to the rails once mated therewith.

The elevator 18 configured for moving the trays 16 between the storage locations 14 and the retrieval space 20 comprises an elevator shaft 55 adjacent the retrieval space 20 and in opposite relation to the access opening 26, and arranged for resting on the support surface SS. In the illustrated arrangement, the storage space 25 and the retrieval space 20 are disposed vertically in-line, in other words the storage space 25 is vertically above the retrieval space 20, such that the elevator shaft is disposed at a longitudinal rear 56 of the storage rack 12, opposite to the front 27. However, in other arrangements, the retrieval space 20 may be located at a horizontally spaced location from the storage space 25 thereabove so as not to be vertically in-line, or the storage space 25 may comprise a first portion situated vertically above the retrieval space 20 and a second portion in horizontally spaced relation thereto.

The elevator shaft 55 defines a generally vertically extending passageway 58 in communication with the storage space 25 and spanning from a bottom 60 of the elevator shaft located at or adjacent the access opening 26 of the storage rack and to a top 62 of the elevator shaft located at or adjacent an uppermost one 14U of the storage locations of the storage rack. In other words, the passageway 58 defined by the elevator shaft spans substantially a full height of the rack 12 including the storage locations 14 and the access opening 26 (and retrieval space 20) therebelow so that the trays 16 can be moved therebetween. For example, the shaft 55 is formed by a plurality of upstanding members and a plurality of longitudinally and/or laterally extending cross members, such as those that form the rack, and can be enclosed by planar panels mounted to the frame members of the shaft.

Furthermore, the elevator 18 includes a platform 65 supported in the elevator shaft 55 for movement within the passageway 58 and configured to carry the trays 16. More specifically, the elevator platform 65 defines an upwardly-facing surface 67 configured to receive a respective one of the trays 16, which surface is substantially planar and horizontal.

In the illustrated arrangement, the platform 65 also includes a transfer assembly 70 (schematically shown) on an upper side thereof, adjacent the surface 67, such that the platform is configured for transferring a respective one of the trays between the elevator shaft 55 and the rack 12, whether the assigned storage location 14 or the retrieval space 20. The transfer assembly 70 is configured to removably secure to a respective one of the trays and to displace same relative to the platform 65 which generally remains in fixed horizontal location in the elevator shaft. More specifically, the transfer assembly 70 is configured for displacing a tray in a longitudinal direction relative to the platform 65. For example, as in the illustrated arrangement, the transfer assembly 70 includes a carrier 72 disposed above the upper surface 67 configured to removably attach to a tray by its base 39. The carrier 72 is movably supported on an endless drive member such as a chain with an upper run 73 extending longitudinally of the platform between the front 43 and rear 44 thereof. The endless drive member is rotatably supported by a main body 65A of the platform 65, which defines the upper surface 67, and is driven for rotation relative to the main body to displace the carrier longitudinally of the platform.

Yet further, the elevator 18 comprises a drive system configured to move the platform 65 vertically relative to the elevator shaft 55, and includes a motor 77, a tensioned member 78 defining a generally vertical path of movement of the platform 65 and supported by the elevator shaft 55 to span from the bottom 60 to the top 62 thereof, and a rotational transmission assembly 80 operatively interconnecting the motor 77 and the tensioned member 78.

In the illustrated arrangement, the motor 77 is mounted in fixed relation to the platform 65, for example on an underside thereof opposite to the surface 67 configured for carrying the trays 16, and there are a pair of the tensioned members arranged at longitudinally spaced positions and on each side in the shaft 55, which are stationary. The rotational transmission assembly 80 comprises a driven rotary member, for example generally in the form of a sprocket, driven for rotation by the motor 77, and configured to travel along a respective one of the tensioned members 78. As such, the transmission assembly includes four such rotary members, two on each lateral side of the platform 65.

The motor 77 is a servomotor operable at a plurality of travel speeds to raise and lower the platform 65 and configured to sense position of the platform 65 relative to the elevator shaft 55. That is, the servomotor 77 is configured to drive rotation of the transmission assembly 80 at different speeds. In order to sense platform position in the shaft, the servomotor 77 is configured to track a distance travelled by the platform for example by counting a number of rotations of its shaft(s) which drive the transmission assembly 80.

For the elevator 18 to identify an assigned one of the storage locations for a tray 16, the elevator 18 includes a plurality of optical sensors 84 for cooperation with the servomotor and arranged on the platform 65 to detect the sidewalls 35 of the rails 33 of the storage rack 12. The optical sensors 84 are supported on an end the platform 65 adjacent the rack 12 and at lateral locations on the platform 65 which register with the rails' sidewalls 35. In the illustrated arrangement, there are a pair of optical sensors carried at the front of the platform which is adjacent the rear 56 of the rack 12.

Generally speaking, the optical sensors 84 are respectively configured to emit light of a prescribed wavelength and to detect reflection of the emitted respective light beams, which when within a prescribed time interval indicate presence of a rail sidewall 35. In the illustrated arrangement, the optical sensors 84 comprise laser sensors configured to emit laser beams.

To enable cooperation of the sensors 84 and the servomotor 77, the elevator 18 includes an elevator controller 86 operatively communicated with the motor 77 and the optical sensors 84, and configured to receive, as input, a selected one of the storage locations 14 for retrieving a corresponding one of the trays 16 stored thereat and to control the motor 77 to:

move the platform 65, at a first travel speed, from an initial position towards a vertically offset position from the rails 33 corresponding to the selected one of the storage locations based on the position sensed by the servomotor 77; and move the platform 65, at a second travel speed lower than the first travel speed, from the vertically offset position and towards the rails 33 until the sidewalls 35 thereof are detected by the optical sensors 84.

In other words, based on the current position of the platform 65, the controller 86 operates the servomotor 77 at a relatively high travel speed to cover substantially the whole distance from the initial position to a position, that is height, corresponding to the selected storage location except for a relatively minor distance thereto, for example about one-hundredth of the total distance to be travelled, which corresponds to the vertically offset position. For this majority portion of the trip from the initial position to the destination position corresponding to the selected storage location, which is usually of the order of about 90% to about 99% of the distance from the initial position to a recorded height of the storage location, the controller 86 utilizes the servomotor to determine when the vertically offset position has been reached or attained. The height of each storage location, and more specifically the rail sidewalls 35 of the rails 33 corresponding to the respective storage locations 14, is stored in a non-transitory memory 88 of the elevator controller and may be determined from an initial calibration process. The heights of the respective storage locations 14 may be measured relative to the access opening 26.

Once the elevator controller 86 has determined that the platform is at the vertically offset position, the controller 86 operates the servomotor 77 at a relatively low travel speed, as the platform 65 is relatively close to the assigned storage location of the tray to be delivered thereto or retrieved therefrom, until the optical sensors 84 detect at least one cooperating opposite pair of the sidewalls 35 of the rails 33 corresponding to the assigned storage location. When there are multiple cooperating opposite pairs of rail sidewalls, the platform 65 is stopped when a designated or prescribed one of the pairs of the rail sidewalls 35 is detected, which is determined based on the items to be stored on the tray for storage at that location in the rack. Information about the items for storage on the tray may be provided by user-input to the system/controller 86. (For example, for tall items, the tray may be deposited on a lowest pair of the rail sidewalls, that is the sidewall pair with the lowest height relative to a bottom of the storage space 25 defined by the partition member 30, while for a tray carrying shorter items, the tray may be deposited on a higher pair of the rail sidewalls.)

The initial or starting position of the platform, from which it moves to the selected storage location, may be a delivery position of the platform 65 in which it is registered with the retrieval space 20 and in turn with the access opening 26 in the rack, that is the platform is located at a common height as the access opening. Alternatively, the initial position may be a previous retrieval position of the platform 65 in which it is registered with one of the storage locations 14 different than that which corresponds to the selected tray.

The vertically offset position is calculated using a prescribed offset from the recorded height of the rails 33, and more specifically the sidewalls 35 thereof, corresponding to the selected storage location that is stored on the memory 88 of the elevator controller.

Preferably, whenever the elevator 18 dynamically locates rail sidewalls corresponding to the selected storage location, the controller 86 performs a step of comparing the detected location (height) with the recorded location (height), and if there is a discrepancy, that is if there is a difference between values thereof, then the controller records the detected location by overwriting the previously recorded height of the rail sidewalls.

If there is a discrepancy between the detected and recorded rail sidewall locations, that is height, the elevator 18 further includes one or more inclinometers 92 (schematically shown) configured to measure an angle of inclination of the platform 65 relative to the horizontal for detecting a tension of the tensioned member 78. The inclinometers 92 are operatively communicated with the controller 86 such that the measured angle of inclination is output thereto. If the angle of inclination measured by the one or more inclinometers 92 is outside a prescribed range, for example it is greater than about 15 degrees, then this suggests that a loss or reduction of tension in the members 78 is likely at fault for the discrepancy between the detected and recorded sidewall locations of the selected storage location. Accordingly, the user may be notified of corrective action. If the measured angle of inclination is within the prescribed range, that is it is less than about 15 degrees, for example, then this suggests that there is a problem of a different type affecting rail location, for example deformation or damage to the rails 33. For example, in the illustrated arrangement, there are four inclinometers, one generally in each corner of the rectangular platform body 65A.

It will be appreciated that in addition to the memory 88, the controller 86 includes a processor 94 operatively communicated with the memory and configured for executing instructions stored thereon.

As in the illustrated arrangement, the controller 86 may receive input as to the selected storage location from an input device 96 configured to receipt input from the user and arranged in proximity to the access opening 26, for example supported on the member 29. Furthermore, in the illustrated arrangement, the vertically offset position is identified by user-input of the prescribed offset, for example using the input device 90.

There is also disclosed a method for retrieving items stored on removable trays 16 in a vertical storage rack 12 comprising the steps of:
 based on user-input of a selected one of the trays for retrieval, moving an elevator platform 65 configured to retrieve the trays at an initial travel speed from an initial position to a vertically offset position from rails 33 of the rack associated with the selected tray; and
 upon detecting the vertically offset position, moving the elevator platform 65 at a lower travel speed from the vertically offset position and towards the rails 33 until inwardly-projecting sidewalls 35 thereof, on which the trays 16 are configured to rest, are detected.

This arrangement provides precise retrieval and storage of trays by accounting for factors that affect positioning of the elevator platform relative to the tray storage locations, for example sagging of the tensioned member or deformation of rails.

Furthermore, the system 10 is configured for detecting and defining edges of rails where trays are deposited. The system is configured to precisely deliver trays within fractions of a millimeter and allows for self-diagnosis of potential delivery issues using the following processes:
 Dynamic Finding Positions: use of servomotor with laser sensors to dynamically identify stopping points (instead of fixed positions determined for example by tooth counter encoder style);
 Dynamic Sensing: continuous use of laser sensors to identify, analyze and detect the edges of the rails using CARL (Check All Rail Positions) methodology
 Deflection evaluation: using current from servomotors in association with sensors used for dynamic tray deflection and CARL, it is possible to accurately deliver trays with precision of fractions of a millimeter;
 Indexed vertical and horizontal movement using servomotor technology and with increments of 0.1 mm: detects and adjusts movement based on current readings of vertical and horizontal drives, minimizing safety gaps between the elevator and rails and applying different measures for retrieval and storage;
 Dynamic evaluation system of the lift position/level: using inclinometer devices directly connected to a controller for example in the form of a programmable logic controller, this system will detect when chain tension needs to be re-adjusted, providing precision delivery at any given circumstances.

As described hereinbefore, the present invention relates to a storage system comprising a rack defining a plurality of storage locations arranged one above the other, trays removably stored at the storage locations, and an elevator configured for moving a selected tray between its assigned storage location and a retrieval space below the storage locations. The storage locations are formed by pairs of horizontally opposite spaced apart rails with inwardly projecting sidewalls on which a tray can be rested. The elevator comprises a platform configured to carry and transfer the trays to and from the rack, and a drive system configured to move the platform that includes a servomotor. The platform carries optical sensors used cooperatively with the servomotor to detect a selected storage location of a tray to be stored or retrieved. Upon input of a selected storage location, the platform is displaced initially at a high speed until reaching a vertically offset position relative to the selected storage position detected using the servomotor, and therefrom at a low speed until sidewalls of the rails of the selected storage location are detected using the optical sensors.

The scope of the claims should not be limited by the preferred embodiments set forth in the examples but should be given the broadest interpretation consistent with the specification as a whole.

The invention claimed is:

1. An apparatus for storing items comprising:
   a storage rack having:
      a plurality of upstanding posts arranged in longitudinally and laterally spaced relation to each other and for resting on a support surface, wherein the posts delimit an upwardly-extending storage space for containing the items during storage and a retrieval space below the storage space with an access opening at a longitudinal front of the rack for user-retrieval of one or more selected ones of the items; and
      a plurality of pairs of horizontally-opposite laterally spaced-apart rails supported on the posts at vertically spaced positions thereon and forming a plurality of respective storage locations arranged one above another in the storage space, wherein each one of each pair of the rails has a pair of inwardly-projecting vertically spaced-apart parallel sidewalls;
   a plurality of trays respectively removably received at the respective storage locations of the storage rack, wherein each tray comprises:
      a base having a generally-horizontal upwardly-facing support surface for receiving items to be stored, wherein the base has a front and a longitudinally opposite rear and laterally opposite sides;
      a pair of upstanding sidewalls connected at the sides of the base; and
      at least one outwardly-projecting flange on each of the sidewalls extending longitudinally of the tray and defining an underside arranged for resting on one of the sidewalls of the rails of the storage rack; and
   an elevator configured for moving the trays between the storage locations and the retrieval space, wherein the elevator comprises:
      an elevator shaft adjacent the retrieval space and in opposite relation to the access opening and arranged for resting on the support surface, wherein the elevator shaft defines a generally vertically extending passageway in communication with the storage space and spanning from a bottom of the elevator shaft located at or adjacent the access opening of the storage rack and to a top of the elevator shaft located at or adjacent an uppermost one of the storage locations of the storage rack;
      a platform supported in the elevator shaft for movement within the passageway and configured to carry the trays and transfer the trays between the elevator shaft and the rack;
      a drive system configured to move the platform vertically relative to the elevator shaft, wherein the drive system includes a motor, a tensioned member defining a generally vertical path of movement of the platform and supported by the elevator shaft to span from the bottom to the top thereof, and a rotational transmission assembly operatively interconnecting the motor and the tensioned member;
      a plurality of optical sensors arranged on the platform to detect the sidewalls of the rails of the storage rack;
      wherein the motor is a servomotor operable at a plurality of travel speeds and configured to sense position of the platform relative to the elevator shaft; and
      an elevator controller operatively communicated with the motor and the optical sensors, wherein the elevator controller is configured to receive, as input, a selected one of the storage locations for retrieving a corresponding one of the trays stored thereat and to control the motor to:
         move the platform, at a first travel speed, from an initial position towards a vertically offset position from the rails corresponding to the selected one of the storage locations based on the position sensed by the servomotor; and
         move the platform, at a second travel speed lower than the first travel speed, from the vertically offset position and towards said rails until the sidewalls thereof are detected by the optical sensors.

2. The system of claim 1 wherein the optical sensors comprise laser sensors configured to emit laser beams.

3. The system of claim 1 wherein the vertically offset position is identified by user-input of a prescribed offset from a recorded height of the rails corresponding to the selected storage location that is stored on a non-transitory memory of the elevator controller.

4. The system of claim 1 further including one or more inclinometers configured to measure an angle of inclination of the platform relative to the horizontal for detecting a tension of the tensioned member.

5. An apparatus for storing items comprising:
   a storage rack having:
      a plurality of upstanding posts arranged for resting on a support surface and forming a storage space for containing the items during storage and a retrieval space with an access opening for retrieval of selected ones of the items; and
      a plurality of rails supported on the posts at spaced positions thereon and forming a plurality of respective storage locations arranged one above another in the storage space;
   a plurality of trays for arrangement at respective storage locations of the storage rack, wherein each tray comprises a base having an upwardly-facing support surface for receiving items to be stored;
   an elevator configured for moving the trays between positions of the storage locations and position of the retrieval space, wherein the elevator comprises:

a passageway in communication with the storage space and extending from position of the access opening of the storage rack and to the positions of the storage locations of the storage rack;

a platform supported in the passageway and configured to carry the trays and transfer the trays to and from the storage rack;

a drive system configured to move the platform along the passageway including a servo-motor and a drive transfer member for moving the platform;

wherein the servomotor is operable at a plurality of travel speeds and configured to sense a position of the platform relative to the positions of the access opening and storage locations;

at least one optical sensor arranged on the platform to detect the position of the platform relative to the positions of the access opening and the storage locations;

an elevator controller operatively communicated with the servomotor and the optical sensors;

wherein the elevator controller is configured to receive, as an input, a selected one of the storage locations for retrieving a corresponding one of the trays stored thereat and to control the servomotor to:

move the platform, at a first travel speed, from an initial position to the selected one of the storage locations based on the position sensed by the servomotor; and if required, move the platform, at a second travel speed lower than the first travel speed, from the selected one of the storage locations based on the position sensed by the servomotor to the position detected by the at least one optical sensor.

6. The apparatus of claim 5 wherein each of the trays comprises a pair of upstanding sidewalls connected at sides of the base; and at least one outwardly-projecting flange on each of the sidewalls extending longitudinally of the tray and defining an underside arranged for resting on one of a plurality of sidewalls of the rails of the storage rack.

7. The apparatus of claim 5 wherein the optical sensors comprise laser sensors configured to emit laser beams.

8. The apparatus of claim 5 wherein the vertically offset position is identified by user-input of a prescribed offset from a recorded height of the rails corresponding to the selected storage location that is stored on a non-transitory memory of the elevator controller.

9. The apparatus of claim 5 further including one or more inclinometer devices configured to measure an angle of inclination of the platform relative to the horizontal and provides an output relative thereto.

10. The apparatus of claim 5 wherein the drive transfer member comprises at least one elongate member under tension and wherein there is provided a controller providing a dynamic evaluation system of the lift position/level which uses the outputs of the inclinometer devices connected to the controller to detect when tension in said at least one elongate member needs to be re-adjusted.

* * * * *